UNITED STATES PATENT OFFICE.

JOHN M. KELTNER, OF SALISBURY, ILLINOIS.

IMPROVEMENT IN HOG-CHOLERA COMPOUNDS.

Specification forming part of Letters Patent No. 204,898, dated June 18, 1878; application filed March 25, 1878.

*To all whom it may concern:*

Be it known that I, JOHN M. KELTNER, of Salisbury, in the county of Sangamon and State of Illinois, have invented a new and useful Medical Compound; and I do hereby declare that the following is a full and exact description of the same.

The object I have in view is to produce a medicine for curing hog cholera. This I effect by means of the following mixture:

For one gallon of the medicine, I take of sal-soda, eight ounces; Epsom salts, six ounces; chlorate of potash, one half ounce; borax, one-half ounce. These are mixed with about four (4) quarts of rain-water, and after the ingredients are completely dissolved the mixture is bottled and is ready for use.

I have found this medicine very effective in the cure of hog cholera.

The manner of administering this compound is as follows: For hogs of eighty pounds weight and upward, I take from two to three pints of the medicine, and mix it with an equal quantity of corn-meal or with any suitable slops. This is given once a day to the hogs, and for five successive days a gradually-decreasing dose is administered. For small pigs or shoats, from one to two pints are given, in the same manner as above.

What I claim as my invention is—

The hog-cholera mixture described, consisting of sal-soda, Epsom salts, chlorate of potash, borax, and water, in about the proportions set forth.

This specification signed and witnessed this 9th day of January, 1878.

JOHN M. KELTNER.

Witnesses:
   THOMAS C. MATHER,
   SAML. D. SCHOLES.